3,455,680
MIXED EXTRACTANT AND PROCESS FOR SEPARATING COPPER FROM COBALT AND NICKEL IN ACID MEDIUM

Allan W. Ashbrook, Ottawa, Ontario, Gordon M. Ritcey, Bells Corners, Ontario, and Edwin G. Joe, Ottawa, Ontario, Canada, assignors to Canadian Patents and Development Limited
No Drawing. Filed Mar. 3, 1966, Ser. No. 531,377
Int. Cl. C22b 15/08, 23/04
U.S. Cl. 75—117    8 Claims

ABSTRACT OF THE DISCLOSURE

A process for separating copper from nickel and cobalt in an aqueous acid leach medium in which the medium is contacted with a mixed extraction reagent at a pH of 0.5 to 3. The reagent consists of an inert organic solvent having dissolved therein 5–30% by volume of di-(2-ethylhexyl)phosphoric acid and 5–30% by volume of an α-hydroxy oxime (LIX 63).

---

This invention relates to the separation of copper from cobalt and nickel in an acid solution in which the three metals are dissolved and, more particularly, to a process in which a mixed extraction reagent comprising an organo phosphoric acid compound and an α-hydroxy oxime is used in the liquid-liquid separation of copper from cobalt and nickel in an acid solution or acid leach slurry.

Processes are known for extracting copper from solutions using organophosphoric acid compounds, e.g. Olson et al., United States Patent No. 3,104,971, issued Sept. 24, 1963. It is also known to use α-hydroxy oxime for this purpose, e.g. Swanson, United States Patent No. 3,224,873, issued Dec. 21, 1965. However, the mixed extraction reagent of this invention has been found to provide much more efficient extractions at lower pH levels than could be obtained with either the organo phosphoric acid compound or the α-hydroxy oxime used separately. Thus, it appears that synergism exists between the two components, which provides superior results when the two components are used mixed together. According to the process of the invention, an acid solution or acid leach slurry containing copper, cobalt and nickel is subjected to liquid-liquid solvent extraction with a mixed solvent extraction reagent comprising an organophosphoric acid and an α-hydroxy oxime dissolved in an inert organic solvent. During the extraction the organic phase becomes loaded with copper while the nickel and cobalt remain in the raffinate.

The two phases are then separated and the organic phase, containing the copper, is treated with dilute mineral acid to strip the copper. The nickel and cobalt can be selectively extracted from the aqueous phase by further contacting with the mixed extraction reagent or by other known methods.

The organo phosphoric acid component of the mixed solvent extraction reagent which can be used according to this invention is advantageously an organo phosphoric acid compound of the following formula

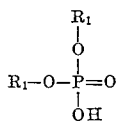

where $R_1$ is selected from the group consisting of alkyl, aryl, and aralkyl radicals. Since the compound must be substantially water-immiscible, the total number of carbon atoms in the molecule should be sufficient to render the compound substantially insoluble. Generally at least 8 carbon atoms should be present. The $R_1$ group can, of course, be substituted with a variety of groups such as alkoxy, halogens, etc., and $R_1$ can be saturated or unsaturated or interrupted by hetero atoms so long as there is no interference in the performance of the compound in extracting copper ions from the aqueous phase to the organic phase.

Particular organophosphoric acid compounds which can be advantageously used according to this invention include di(2-ethylhexyl) phosphoric acid, heptadecylphosphoric acid, dodecylphosphoric acid, di(1-methylheptyl) phosphoric acid, diisooctylphosphoric acid, di(2-ethyl-4-methylpentyl) phosphoric acid, di(2-propyl-4-methyl-pentyl) phosphoric acid, octylphenyl phosphoric acid, the isooctyl or stearyl derivatives of alkyl acid phosphates, and the like.

The α-hydroxy oxime component has the general formula

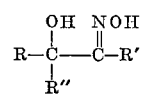

where R, R' and R" may be any of a variety of organic hydrocarbon radicals such as aliphatic and alkylaryl radicals. R" may also be hydrogen. Preferably, R and R' are unsaturated hydrocarbon or branched chain alkyl groups containing from about 6 to 20 carbon atoms. R and R' are also preferably the same and, when alkyl, are preferably attached to the carbons substituted with the —OH and =NOH groups through a secondary carbon atom. It is also preferred that R" is hydrogen or unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9,27-dien-18-oxime, 5-10-diethyl-8-hydroxytetradecan-7-oxime, and 5,8-diethyl-7-hydroxy-dodecane-6-oxime. The latter compound has the following structural formula:

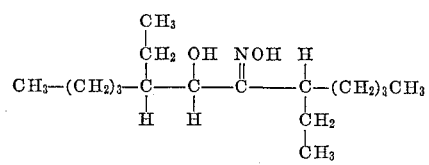

Representative of other mono- and polyunsaturated radicals are heptenyl, octenyl, decenyl, octadecenyl, octadecynyl and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like.

The α-hydroxy oxime component is also characterized as having a solubility of at least 2% by weight in the hydrocarbon solvent used to make up the organic phase and substantially complete insolubility in water.

The α-hydroxy oximes are prepared by reacting an acyloin with a hydroxylamine salt under reflux conditions. Such reaction can be carried out by refluxing the reactants in an alcohol such as ethanol and adding pyridine to combine with the acid associated with the hydroxylamine.

A wide variety or organic diluents, in which the extraction reagent is dissolved, can be employed according to this invention. The minimum requirements for the diluent, however, are that the diluent be substantially water-immiscible, that it will dissolve the extraction reagent, and that it will not interfere with the function of the reagent in extracting the copper values from acid solutions. These diluents can be aliphatic or aromatic hydrocarbons, halogenated hydrocarbons, petroleum derivatives, ethers, etc. Examples of these various diluents include toluene, carbon tetra-chloride, benzene, chloroform, 2-ethyl-hexanol, and particularly kerosene.

The ratio of the components in the mixed solvent extraction reagent can be varied over a wide range. However, for practical purposes, the volume percent of each constituent in the mixture can vary from about 5% to about 30%.

It has also been found to be desirable to incorporate an additive in the solvent mixture to inhibit emulsions and assist in phase separation. Long chain aliphatic alcohols are well suited for this purpose and isodecanol has been found to be particularly suitable.

Contacting of the acid solution containing the copper, nickel and cobalt values with the solvent extraction reagent may be carried out by any of the well-known procedures employed in solvent-solvent extractions. Although continuous countercurrent methods are preferred, batch, continuous batch, and batch countercurrent methods are also useful. Any suitable liquid-liquid contacting means may be employed, such as a pulse column, a countercurrent rotating disc column, and the like. The temperature at which the mixing is carried out is not critical, but advantageously the temperature is maintained at about 20° C. to 40° C.

The extraction preferably takes place at a pH in the range of about 0.5 to about 3.0. A low pH has been found to be particularly desirable since the selectivity of metal separation is better with the low pH. An important consideration in determining the pH level of the extraction is the amount of iron and aluminium to be found in the acid solution. Thus, in order to assure high loading in the organic phases, the pH must be adjusted above that level where iron will precipitate and below the precipitation pH (approximately 3.8 to 4) of aluminium. If appreciable iron is in solution, this will precipitate and cause emulsions in the organic-aqueous contact. If aluminium is allowed to precipitate, emulsions are also formed.

The ratio of the volume of the organic phase to the aqueous phase can be varied considerably and the most efficient ratio in each case can be readily determined by one skilled in the art. The particular ratio selected for any given extraction may depend upon the extraction reagent, diluent, and type of copper bearing solution employed as well as their concentration and the method of mixing them, etc. Countercurrent methods are usually desirable when the ratio of the organic phase to the aqueous phase is relatively low. It has been found that for extraction in a pulse column, an organic to aqueous ratio of about 1:1 is very satisfactory.

After the copper values have been transferred to the organic phase and the aqueous and organic phases separated, the copper containing organic phase is transferred to a stripping circuit which can be any suitable liquid-liquid contactor. In the stripping circuit the copper-containing organic phase is advantageously contacted with 2–20% by volume of a mineral acid, e.g. sulphuric, nitric or hydrochloric, the choice of acid depending on the copper salt required.

The cobalt and nickel remaining in the aqueous phase can be separated by any suitable method, such as those described in co-pending Ashbrook et al. application Ser. No. 465,750 filed June 21, 1965 and Ritcey et al. application Ser. No. 465,789 filed June 21, 1965. It is also possible to separate the cobalt and nickel remaining in the aqueous phase by again contacting this phase with the mixed extraction reagent of the invention. In this extraction the cobalt values are transferred to the organic phase while the nickel values remain in the aqueous phase. The cobalt can then be stripped from the organic phase.

The acid solution is prepared by first leaching an ore containing copper, nickel and cobalt with an acid. Nitric or sulphuric acid has been found to be the most suitable for the leaching step. After leaching, the leach slurry may be filtered to obtain a solution containing copper, nickel and cobalt, or the leach slurry may be contacted directly with the mixed extraction reagent according to the invention. From an economic standpoint there is considerable advantage in conducting the extraction directly on the leach slurry.

The invention will now be illustrated by reference to the following non-limitative examples:

EXAMPLE 1

A series of liquid extractions were conducted on a solution containing 5.5 g./l. Cu, 4.4 g./l. Ni and 5.4 g./l. Co, using as extraction solvent Shell 140 Flash Naphtha containing varying amounts of a mixture of di(2-ethylhexyl) phosphoric acid and $\alpha$-hydroxy oxime available from General Mills, Inc. under the trademark "LIX–63." The extraction was carried out at an equilibrium pH of 1–1.5.

The feed pH was 1.85, the aqueous to organic ratio was 1:1 and the contact time was 5 minutes.

The results of these extractions are tabulated in Table A below:

TABLE A

| Di (2-ethyl-hexyl) phosphoric acid, v/o | LIX-63, v/o | Extract, g./l. | | | Raffinate, g./l. | | | Equil pH |
|---|---|---|---|---|---|---|---|---|
| | | Cu | Ni | Co | Cu | Ni | Co | |
| 5 | 1 | 0.9 | <0.1 | <0.1 | 4.7 | 5.0 | 5.6 | 1.5 |
| 5 | 3 | 1.7 | <0.1 | <0.1 | 4.0 | 5.1 | 5.3 | 1.5 |
| 5 | 5 | 2.6 | <0.1 | <0.1 | 3.4 | 4.9 | 4.8 | 1.2 |
| 5 | 7 | 3.2 | <0.1 | 0.1 | 2.7 | 4.8 | 4.8 | 1.1 |
| 5 | 10 | 3.5 | <0.1 | 0.2 | 1.9 | 4.8 | 5.1 | 1.1 |
| 5 | 15 | 4.0 | <0.1 | 0.3 | 1.5 | 5.2 | 5.1 | 1.1 |
| 5 | 20 | 4.3 | <0.1 | 0.3 | 1.5 | 5.1 | 4.8 | 1.1 |
| 1 | 5 | 1.2 | <0.1 | <0.1 | 4.5 | 5.3 | 5.7 | 1.5 |
| 3 | 5 | 2.0 | <0.1 | 0.1 | 3.5 | 5.4 | 5.0 | 1.4 |
| 7 | 5 | 2.6 | <0.1 | <0.1 | 3.0 | 5.4 | 5.0 | 1.3 |
| 10 | 5 | 3.2 | <0.1 | <0.1 | 2.7 | 5.5 | 5.7 | 1.3 |
| 15 | 5 | 3.2 | 0.1 | <0.1 | 2.5 | 5.2 | 5.7 | 1.3 |
| 20 | 5 | 3.2 | 0.1 | 0.1 | 2.2 | 5.2 | 6.0 | 1.3 |

EXAMPLE 2

Tests were also conducted on leach slurry obtained by acid leaching of a uranium refinery residue of the general type having the following analysis:

TABLE B

| Element | Percent (wt. dry basis) |
|---|---|
| Ag | 0.006 |
| As | 2.2 |
| Bi | 0.26 |

| Element | Percent (wt. dry basis) |
|---|---|
| Cl | 0.02 |
| Co | 1.76 |
| CO$_3$ | 10.1 |
| Cu | 2.20 |
| Fe | 5.33 |
| Ni | 0.90 |
| U | 0.25 |

(a) Leaching

A refinery residue of the above type was leached with sulphuric acid for 2 hours at a temperature of 60° C. A 90% dissolution or over of copper, cobalt and nickel was achieved with the addition of 1000 pounds of sulphuric acid per ton of residue. The leach slurry contained about 20% solids.

(b) Extraction equipment

The equipment used to extract the nickel, copper and cobalt from the leach slurry is a pulse column consisting of a 6 inch diameter by 2 foot long Pyrex feed chamber and organic overflow, a 30 foot long 2 inch diameter Pyrex pipe section with 180 stainless steel dispersion plates at 2 inch intervals and an expanded discharge section for emulsion disengagement. The dispersion plates have ⅜ inch diameter holes sufficient to yield a 34% open area. The pulse is supplied by a single stroke diaphragm pump with variable amplitude and frequency adjustment. Organic flow is metered through a flow rotor. Pulp feed and discharge rates are controlled by variable speed finger pumps.

(c) Extraction of copper

A copper extraction was conducted with the above equipment on a leach slurry feed containing 0.05 g./l. uranium, 6.4 g./l. copper, 2.8 g./l. nickel and 5.1 g./l. cobalt.

The organic employed in this circuit was a 10% di-(2-ethylhexyl)phosphoric acid plus 10% "LIX-63" in 140 Flash Naphtha with 3% isodecanol added as an emulsion suppressant.

The operating conditions were as follows:

| | |
|---|---|
| Total flow | 8 gals./hr. |
| Aqueous/organic ratio | 1:1. |
| Pulse amplitude | ¾ inch. |
| Pulse frequency | 52. |
| Start pH | 2.5. |
| Terminal pH | 2.2. |
| NH$_4$OH added [1] | 1% of aqueous flow as 1.2 M NH$_4$OH. |

[1] The NH$_4$OH was added to the aqueous flow to maintain the pH above 2.0.

An analysis of the organic phase showed <.001 g./l. uranium, 6.5 g./l. copper, 0.014 g./l. nickel and 0.017 g./l. cobalt while the raffinate contained 0.05 g./l. uranium and 0.04 g./l. copper.

(d) Stripping of copper

The copper was stripped from the organic phase by an 80 g./l. H$_2$SO$_4$ solution at 50° C. in a pulper-decanter circuit. The stripping efficiency obtained was 86% leaving a copper residual of less than 1 g./l. in the stripped organic.

The stripped liquor can be recirculated to crystallization or electrolysis.

(e) Extraction of cobalt

The raffinate from the copper extraction was neutralized to pH 4 and extracted in a pulse column with an organic feed consisting of a 10% di(2-ethylhexyl)phosphoric acid plus 10% "LIX-63" in 140 Flash Naphtha. Ammonium hydroxide was added along the column to maintain the pH above 3. At a total flow rate of 8 gallons per hour with an organic to aqueous ratio of 1:1, over 90% of the cobalt was extracted in the organic. However, the organic contained 0.16 g./l. Ni and only 3.58 g./l. Co yielding a nickel impurity in the cobalt of about 5%. This nickel level can be reduced to less than 1% but recovery of cobalt would be lessened to 50%. The cobalt was readily stripped with 10% HNO$_3$. The strip solution after several recycles can be boiled down to the nitrate form or calcined to produce cobalt oxide powder.

(f) Recovery of nickel

The cobalt circuit raffinate was neutralized to pH 6 with lime and filtered. The nickel was then precipitated with sodium carbonate.

We claim:

1. A process for separating copper from nickel and cobalt in an aqueous acid leach medium containing the above metals, which comprises contacting said medium with a mixed extraction reagent at a pH in the range of 0.5 to 3, the mixed extraction reagent comprising an inert organic solvent having dissolved therein (a) 5–30% by volume of an organo phosphoric acid compound having the formula

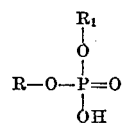

wherein each R$_1$ is an alkyl radical and the R$_1$ groups together contain at least 8 carbon atoms and (b) 5–30% by volume of an α-hydroxy oxime having a solubility of at least 2% by weight in the organic solvent and having the formula

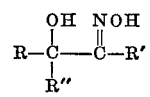

where R and R' are selected from the group consisting of unsaturated hydrocarbon radicals and branched chain alkyl groups containing 6 to 20 carbon atoms and R" is selected from the group consisting of hydrogen and unsaturated hydrocarbon radicals and branched chain alkyl groups containing 6 tto 20 carbon atoms, whereby the copper values are extracted from the aqueous phase to the organic phase and separating the resultant copper loaded organic phase from the aqueous phase.

2. A process according to claim 1 wherein the medium is an acid leach solution.

3. A process according to claim 1 wherein the medium is an acid leach slurry.

4. A process according to claim 1 wherein the α-hydroxy oxime contains a total of from about 14 to 16 carbon atoms.

5. A process according to claim 1 wherein the copper is stripped from the organic phase by treatment with a dilute mineral acid.

6. A process according to claim 1 wherein the organo phosphoric acid compound is di(2-ethylhexyl)phosphoric acid.

7. A process according to claim 1 wherein the inert organic solvent is kerosene.

8. A process according to claim 1 wherein the mixed extraction reagent contains about 3–5% of a long chain aliphatic alcohol as emulsion inhibitor.

References Cited

UNITED STATES PATENTS

| | | | |
|---|---|---|---|
| 3,104,971 | 9/1963 | Olson et al. | 75—117 |
| 3,224,873 | 12/1965 | Swanson | 75—101 |
| 2,992,894 | 7/1961 | Hazen et al. | 75—117 |
| 3,276,863 | 10/1966 | Drobnick et al. | 75—117 |

L. DEWAYNE RUTLEDGE, Primary Examiner

T. R. FRYE, Assistant Examiner

U.S. Cl. X.R.

23—55; 75—101, 119